(12) United States Patent
Sartain

(10) Patent No.: US 6,871,484 B1
(45) Date of Patent: Mar. 29, 2005

(54) WHEELED STRING TRIMMER

(76) Inventor: Jerry W. Sartain, 15456 Stonehedge Cliffs Rd., Northport, AL (US) 35475

( * ) Notice: Subject to any disclaimer, the term of this patent is extended or adjusted under 35 U.S.C. 154(b) by 0 days.

(21) Appl. No.: 10/724,467

(22) Filed: Dec. 1, 2003

(51) Int. Cl.[7] .............................................. A01D 34/84
(52) U.S. Cl. ......................................... 56/12.7; 30/276
(58) Field of Search .............................. 30/276; 56/12.7, 56/16.7

(56) References Cited

U.S. PATENT DOCUMENTS

| | | | |
|---|---|---|---|
| 4,033,098 A | | 7/1977 | Green |
| 4,052,789 A | * | 10/1977 | Ballas, Sr. .................. 30/276 |
| 4,187,598 A | | 2/1980 | Pittinger, Jr. |
| 4,189,833 A | | 2/1980 | Kwater |
| 4,295,324 A | | 10/1981 | Frantello et al. |
| 4,338,719 A | * | 7/1982 | Burkholder .................. 30/276 |
| 4,531,350 A | | 7/1985 | Huthmacher |
| 4,860,451 A | * | 8/1989 | Pilatowicz et al. ........... 30/276 |
| 4,894,916 A | | 1/1990 | Nimz et al. |
| 5,140,249 A | | 8/1992 | Linder et al. |
| 5,408,816 A | | 4/1995 | Cartier |
| 5,467,584 A | * | 11/1995 | Boyles ....................... 56/12.7 |
| 5,771,582 A | * | 6/1998 | Tuggle ........................ 30/125 |
| 6,249,978 B1 | * | 6/2001 | Sheldon ...................... 30/276 |
| 6,588,109 B2 | * | 7/2003 | Wilson ........................ 30/276 |

* cited by examiner

Primary Examiner—Meredith C. Petravick
(74) Attorney, Agent, or Firm—Donald R. Schoonover

(57) ABSTRACT

A harvester of the type known as a string trimmer includes a wheel on which the harvester rests. The harvester is supported by the wheel during use.

1 Claim, 1 Drawing Sheet

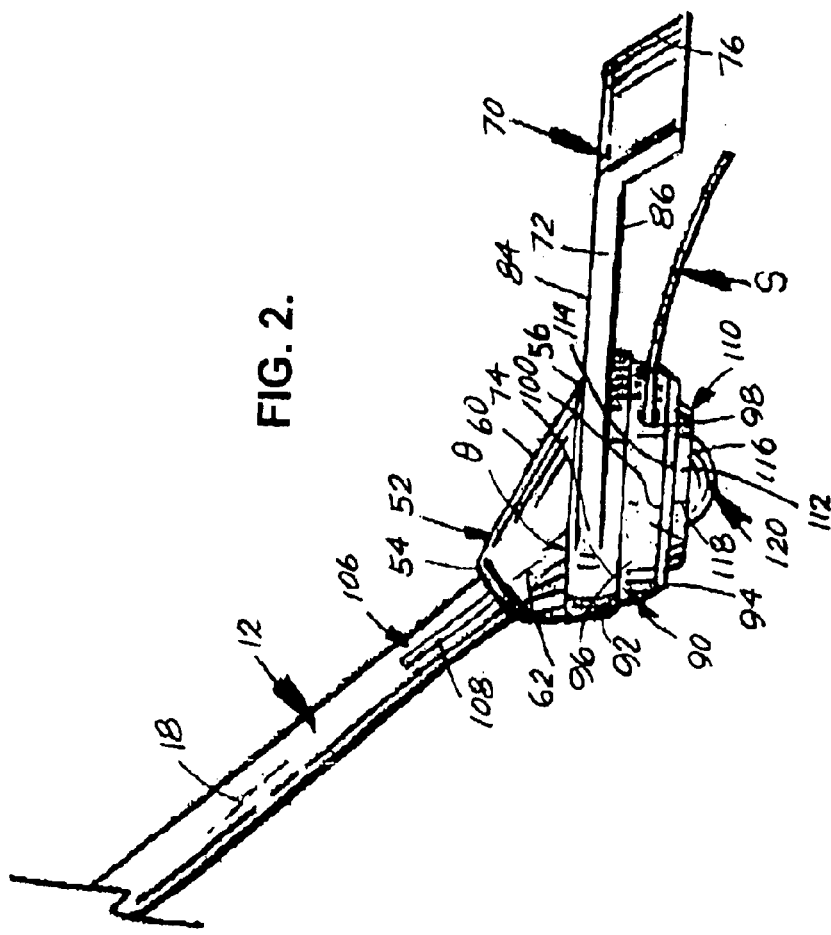
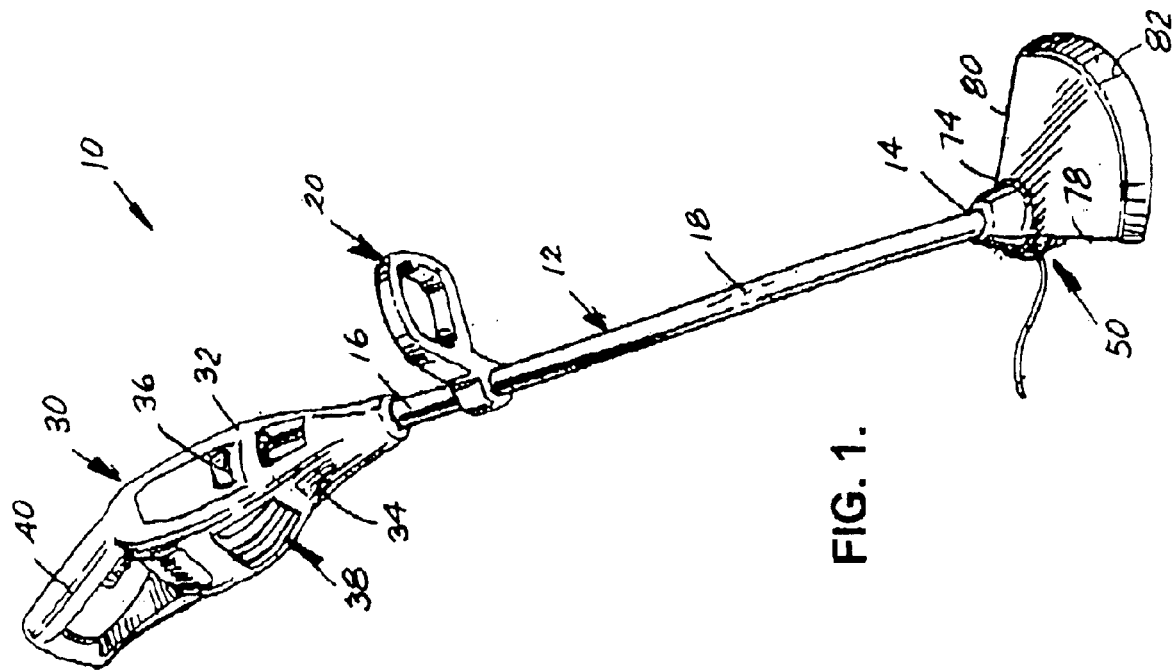

WHEELED STRING TRIMMER

BACKGROUND OF THE INVENTION

1. Field of the Invention

The present invention relates to the general art of harvesters, and to the particular field of harvesters with a rotatable element on a shaft.

2. Discussion of the Related Art

Many people use some form of harvester to trim the grass and weeds around their homes. These harvesters include the so-called WEED EATER™ or, more generically, string trimmer which includes a filament attached to a motor and rotated at high speed to cut the grass or weeds. String trimmers are very convenient and easy to use and thus have enjoyed considerable commercial success.

However, many people find that they must maneuver the string trimmer into difficult to reach areas. This can be cumbersome. Such difficulties can be exacerbated if the terrain is difficult and hilly. It may be difficult to use a string trimmer on a hill with a steep incline. The harvester may also have to be lifted into various positions to be effective.

Therefore, there is a need for a harvester of the type which includes a rotatable element on a shaft which can be easily maneuvered.

Often, a user operates a string trimmer for long periods of time. This can be tiring if the device must be carried and held above ground.

Therefore, there is a need for a harvester of the type which includes a rotatable element on a shaft which can be easily supported in position to operate for long periods of time without unduly tiring the operator.

PRINCIPAL OBJECTS OF THE INVENTION

It is a main object of the present invention to provide a harvester of the type which includes a rotatable element on a shaft which can be easily maneuvered.

It is another object of the present invention to provide a harvester of the type which includes a rotatable element on a shaft which can be easily supported in position to operate for long periods of time without unduly tiring the operator.

SUMMARY OF THE INVENTION

These, and other, objects are achieved by a harvester which comprises a handle element having a first end, a second end, and a longitudinal axis extending between the first end of the handle element and the second end of the handle element; a hub on the first end of the handle element, the hub having an oblique conical side wall which includes a first end mounted on the handle element, and a second end; a string housing mounted on the hub, the string housing being hollow and including a first end mounted on the second end of the hub, a second end, a longitudinal axis which extends between the first end of the string housing and the second end of the string housing and which extends at an oblique angle with respect to the longitudinal axis of the handle element, and a side wall having a string-accommodating hole defined therethrough and which is adapted to accommodate string being used during a harvesting operation; a guard mounted on the hub; and a support roller unit mounted on the second end of the string housing, the support roller unit including an annular support roller housing having a first end which is mounted on the second end of the string housing, a second end, a longitudinal axis which is co-linear with the longitudinal axis of the string storage housing, and a support roller ball rotatably mounted on the support roller housing to extend out of the second end of the support roller housing and which is adapted to rollingly contact a support surface located beneath the string used during a harvesting operation.

The harvester embodying the present invention is thus easy to maneuver and is supported so that it can be rolled during use whereby it will not unduly tire the user. The harvester can be used on hilly terrain as well as in difficult to reach areas while still being supported in a maneuverable manner.

BRIEF DESCRIPTION OF THE DRAWING FIGURES

FIG. 1 is a perspective view of a harvester embodying the present invention.

FIG. 2 is a side elevational view of a portion of the harvester shown in FIG. 1 and illustrating the wheel included in the harvester embodying the present invention.

DETAILED DESCRIPTION OF THE PREFERRED EMBODIMENT

Other objects, features and advantages of the invention will become apparent from a consideration of the following detailed description and the accompanying drawings.

Referring to the Figures, it can be understood that the present invention is embodied in a harvester 10 that will be comfortable and convenient to use.

Harvester 10 comprises a handle element 12 which has a first end 14 which is a distal end when the handle element 12 is in a use orientation, a second end 16 which is a proximal end when the handle element 12 is in the use orientation, and a longitudinal axis 18 which extends between the first end 14 of the handle element 12 and the second end 16 of the handle element 12.

Harvester 10 further includes a first hand grip element 20 mounted on the handle element 12 near the second end 16 of the handle element 12 and which is gripped to add stability to the use of harvester 10 during a harvesting operation.

A second hand grip element 30 is mounted on the handle element 12 on the second end 16 of the handle element 12. The second hand grip element 30 includes a housing 32 and a power source 34 in the housing 32. The power source 34 can be a battery or can be a motor that is powered via electricity or an internal combustion-type engine. Those skilled in the art will understand the type of power source required based on the teaching of this disclosure.

An on/off control 36 is mounted in the housing 32 of the second hand grip element 30 and is connected to the power source 34 to control operation of that power source 34.

A supply 38 of string is located in the housing 32, and a handgrip element 40 is mounted on the housing 32.

A cutting head unit 50 is mounted on the first end 14 of the handle element 12. Unit 50 includes a hub 52 mounted on the first end 14 of the handle element 12. Hub 52 includes a first end 54 which is a top end when the hub 52 is in a use orientation and which is oriented at a right angle with respect to the longitudinal axis 18 of the handle element 12. The hub 52 also includes a second end 56 which is a bottom end when the hub 52 is in the use orientation and which is oriented at an oblique angle, θ, with respect to the longitudinal axis 18 of the handle element 12. The second end 56 of the hub 52 is oriented at oblique angle, θ, with respect to the longitudinal axis 18 of the handle element 12. A side wall 60 connects the first end 54 of the hub 52 to the second end 56 of the hub 52. The side wall 60 of the hub 52 has a non-right angular shape. The hub 52 further includes a longitudinal axis 62 which extends between the first end 54 of the hub 52 and the second end 56 of the hub 52 and which is co-linear with longitudinal axis 18 of the handle element 12 and which is oriented at oblique angle, θ, with respect to the side wall of the hub 52. The side wall 60 of the hub 52 is oblique frusto-conical in shape.

A guard element 70 is mounted on the hub 52. Guard element 70 includes a body 72 which has a proximal end 74 mounted on the hub 52 and located adjacent to the first end 14 of the handle element 12, a distal end 76, a first side 78, a second side 80, and a shield 82 on the distal end 76 of the body 72 of the guard element 70. A first surface 84 is a top surface when the guard element 70 is in a use orientation as shown in FIGS. 1 and 2 and a second surface 86 is a bottom surface when the guard element 70 is in the use orientation.

A hollow string storage housing 90 is rotatably mounted on the second end 56 of the hub 52. String storage housing 90 is hollow and has a first end 92 located adjacent to the second end 56 of the hub 52, a second end 94, and a side wall 96 which connects the first end 92 of the string storage housing 90 to the second end 94 of the string storage housing 90. A string-accommodating hole 98 is defined through the side wall 96 of the string storage housing 90 and which is adapted to accommodate a string S used during a harvesting operation in a manner that permits the string S to be mounted on the string storage housing 90 and to extend from inside the string storage housing 90 through the side wall 96 of the string storage housing 90. The string storage housing 90 further includes a longitudinal axis 100 which extends between the first end 92 of the string storage housing 90 and the second end 94 of the string storage housing 90. Longitudinal axis 100 of the string storage housing 90 is oriented at oblique angle, θ, with respect to the longitudinal axis 18 of the handle element 12.

A drive connection system 106, which includes a drive shaft 108 or the like, connects the string storage housing 90 to the power source 34 in the housing 32 of the second hand grip element 30 via the on/off control 36 in the housing 32 of the second hand grip element 30. The drive connection system 106 is well known to those skilled in the art and thus will not be further discussed. The string storage housing 90 is rotated by the power source 34 when the on/off switch 36 is in an "on" condition as is understood by those skilled in the art.

A support roller unit 110 is mounted on the second end 94 of the hollow string housing 90. The support roller unit 110 includes an annular support roller housing 112 having a first end 114 which is mounted on the second end 94 of the hollow string housing 90, a second end 116, and a longitudinal axis 118 which is co-linear with the longitudinal axis 100 of the string storage housing 90.

A support roller ball 120 is rotatably mounted on the support roller housing 112 to extend out of the second end 116 of the support roller housing 112 and is adapted to rollingly contact a support surface, such as the ground, and which is located beneath the string used during a harvesting operation.

Operation of harvester 10 can be understood from the foregoing, but it is noted that the harvester 10 rests on the support roller 120 during the harvesting operation and thus a user need not support the harvester 10 during such operation. The harvester 10 can be oriented as required since the roller ball 120 is spherical and rolls in the support roller housing 112 as required to support the harvester. The oblique relationship between the longitudinal axis 118 of the support roller unit 110 and the handle 12 permits the harvester 10 to be held by a user in the orientation that is most convenient and comfortable for the user. The roller ball 120 will contact an inclined surface, such as a hill, and permit easy use of the harvester 10 by a user standing on top of the hill. The oblique orientation of the roller ball 120 with respect to the handle 12 further facilitates this ease of operation.

It is understood that while certain forms of the present invention have been illustrated and described herein, it is not to be limited to the specific forms or arrangements of parts described and shown.

What is claimed and desired to be covered by Letters Patent is as follows:

1. A harvest comprising:
   a) a handle element having
      (1) a first end which is a distal end when said handle element is in a use orientation,
      (2) a second end which is a proximal end when said handle element is in the use orientation, and
      (3) a longitudinal axis which extends between the first end of said handle element and the second end of said handle element;
   b) a first hand grip element mounted on said handle element near the second end of said handle element;
   c) a second hand grip element mounted on said handle element on the second end of said handle element, said second hand grip element including
      (1) a housing,
      (2) a power source in the housing of said second hand grip element,
      (3) an on/off control in the housing of said second hand grip elment and connected to the power source,
      (4) a supply of string in the housing, and
      (5) a handgrip element on the housing; and
   d) a cutting head unit mounted on the first end of said handle element and including
      (1) a hub mounted on the first end of said handle element, the hub including a first end which is a top end when the hub is in a use orientation and which is oriented at a right angle with respect to the longitudinal axis of said handle element, a second end which is a bottom end when the hub is in the use orientation and which is oriented at an oblique angle with respect to the longitudinal axis of said handle element, the second end of the hub being oriented at the oblique angle with respect to the longitudinal axis of said handle element, a side wall which connects the first end of the hub to the second end of the hub, the side wall of the hub being a non-right angular shape, the hub including a longitudinal axis which extends between the first end of the hub and the second end of the hub and which is co-linear with the longitudinal axis of said handle element and which is oriented at the oblique angle to the side wall of the hub, the side wall of the hub being oblique frusto-conical in shape,
      (2) a guard element which is mounted on the hub and which includes a body having a proximal end mounted on the hub to be located adjacent to the first end of said handle element, a distal end, a first side, a second side and a shield on the distal end of the body of said guard element, a first surface which is a top surface when the guard element is in a use orientation and a second surface which is a bottom surface when the guard element is in the use orientation, (3) a hollow string storage housing rotatably mounted on the second end of the hub, the string storage housing being hollow and having a first end located adjacent to the second end of the hub, a second end, a side wall which connects the first end of the string storage housing to the second end of the string storage housing, a string-accommodating hole defined through the side wall of the string storage housing and which is adapted to accommodate string used during a harvesting operation in a manner that permits the string to be mounted on the string storage housing and to extend from inside the string storage housing through the side wall of the string storage housing, the string storage housing including a longitudinal axis which extends between the first end of the string storage housing and the second end of the string storage housing, the longitudinal axis of the string storage housing being oriented at the oblique angle with respect to the longitudinal axis of said handle element, (4) a drive connection system connecting the string storage housing to the power source in the housing of said second hand grip element via the on/off control in the housing of said second hand grip element, the string storage housing being rotated by the power source when the on/off switch is in an "on" condition, and (5) a support roller unit mounted on the second end of the hollow string housing, the support roller unit including
   (A) an annular support roller housing having a first end which is mounted on the second end of the hollow string housing, a second end, a longitudinal axis which is co-linear with the longitudinal axis of the string storage housing, and
   (B) a support roller ball rotatably mounted on the support roller housing to extend out of the second end of the support roller housing and which is adapted to rollingly contact a support surface located beneath the string used during a harvesting operation.

* * * * *